United States Patent [19]
Goff et al.

[11] Patent Number: 5,284,636
[45] Date of Patent: Feb. 8, 1994

[54] METHOD OF STABILIZING HEAVY METALS IN ASH RESIDUES FROM COMBUSTION DEVICES BY ADDITION OF ELEMENTAL PHOSPHORUS

[75] Inventors: Stephen P. Goff, Orefield; John J. Lewnard, Emmaus; Shoou-I Wang, Allentown, all of Pa.

[73] Assignee: Air Products and Chemicals, Inc., Allentown, Pa.

[21] Appl. No.: 857,363

[22] Filed: Mar. 25, 1992

[51] Int. Cl.$^5$ .................. C01B 21/00; C01B 17/00
[52] U.S. Cl. .................. 423/235; 423/242.1; 588/256
[58] Field of Search ............ 423/242, 244, 235, 238, 423/242.1, 243.01, DIG. 20, 244.01, 244.06; 588/256

[56] References Cited

U.S. PATENT DOCUMENTS

| | | | |
|---|---|---|---|
| 3,058,803 | 10/1962 | Hinkle et al. | 423/243.01 |
| 4,049,462 | 9/1977 | Cocozza | 423/244 A |
| 4,247,321 | 1/1981 | Persinger | 423/235 |
| 4,737,356 | 4/1988 | O'Hara et al. | 423/659 |
| 5,037,479 | 8/1991 | Stanforth | 423/DIG. 20 |
| 5,106,601 | 4/1992 | Chang et al. | 423/235 |

FOREIGN PATENT DOCUMENTS

38424A1 10/1982 Fed. Rep. of Germany ......... B01D 53/54

OTHER PUBLICATIONS

"The SITE Demonstration of the CHEMFIX Solidification/Solidification Process at the Portable Equipment Salvage Company Site" *Journal of Air Waste Management Association*, E. F. Barth, Feb. 1990.

"Attenuation of Cd and Pb Solubility in Municipal Waste Incineration Ash" Soil Sci. Plant Anal., vol. 17, No. 4, pp. 385-392 (1986) Behel, et al.

"LBL PhosNOX Process for Combined Removal of $SO_2$ and $NO_x$ from Flue Gas" 1991 Summer AIChE Summer National Meeting, Chang and Lee, Aug. 18, 1991.

*Primary Examiner*—Michael Lewis
*Assistant Examiner*—Stephen G. Kalinchak
*Attorney, Agent, or Firm*—Thomas G. Ryder; James C. Simmons; William F. Marsh

[57] ABSTRACT

A process for the stabilization of heavy metals in the ash produced by the combustion of a heavy metals containing fuel, such as municipal solid waste, by introducing into the combustion system a phosphorous oxide specie or elemental yellow phosphorus. The additive can be introduced at any point in the system upstream of the particulate removal device employed in the system. If elemental phosphorus is used, it must be introduced at a point in the system where it will be exposed to an elevated temperature and oxygen, so as to be converted to a phosphorus oxide specie. When elemental phosphorus is introduced into the system downstream of the combustion zone, it is also effective to reduce the NO content of the flue gas.

16 Claims, 1 Drawing Sheet

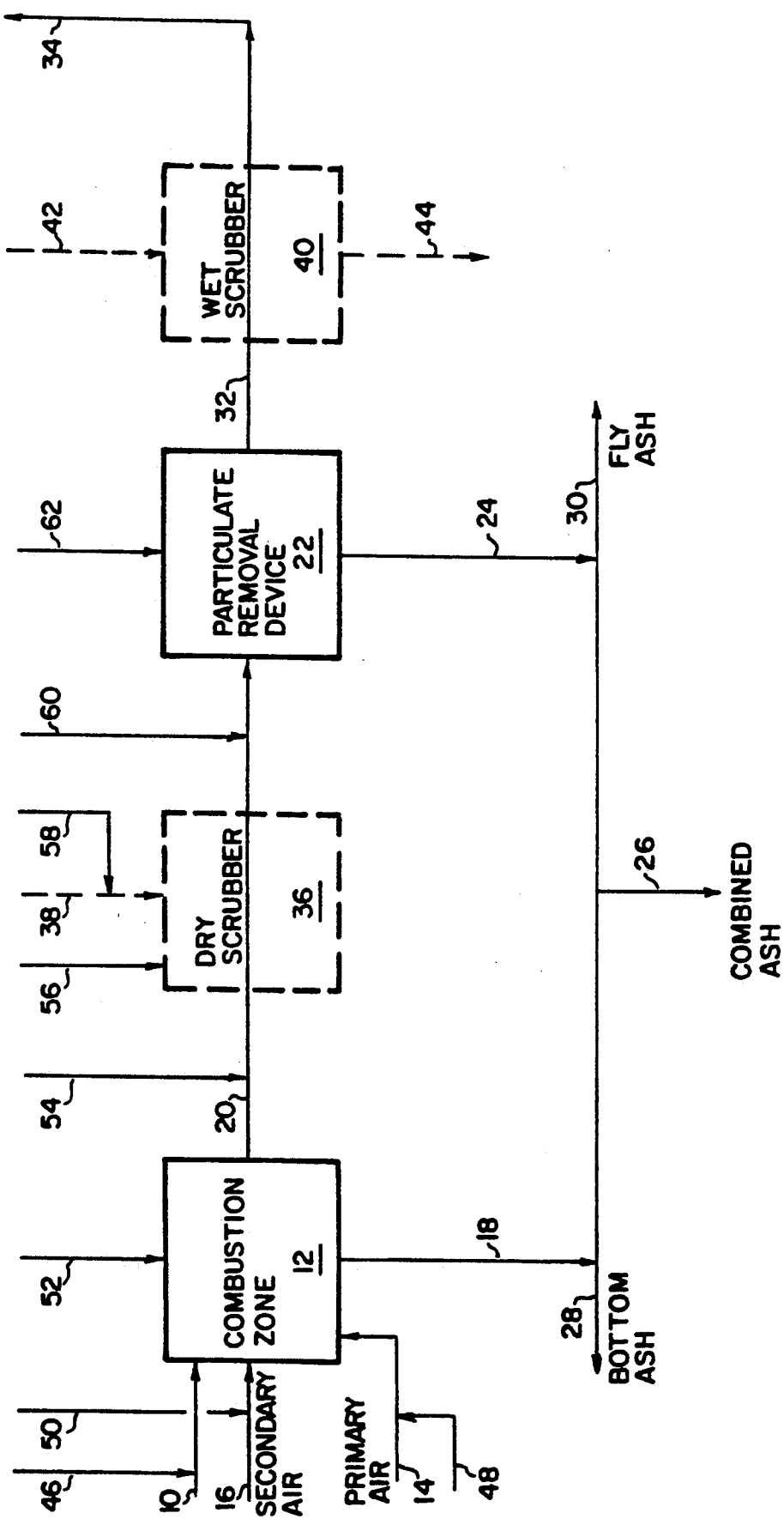

METHOD OF STABILIZING HEAVY METALS IN ASH RESIDUES FROM COMBUSTION DEVICES BY ADDITION OF ELEMENTAL PHOSPHORUS

FIELD OF THE INVENTION

This invention relates to the stabilization of heavy metals contained in the ashes produced in combustion systems. More particularly this invention relates to heavy metals stabilization effected by the introduction into the combustion system of phosphorous oxide species, or the precursors thereof, especially elemental phosphorus, particularly yellow phosphorus.

BACKGROUND OF THE INVENTION

Combustion of solid and many liquid fuels typically results in the generation of several effluent streams, which must comply with increasingly stringent requirements to prevent the discharge of noxious species. The increasing cost of energy provides incentives to utilize low cost fuels which often produce higher levels of pollutants, particularly in the ash residues from the combustion. In addition, there is increasing need to combust waste-derived materials, with or without energy recovery, as a method for disposing of this material. Combustion of such material can generate hazardous species which are incorporated into the ash. Included in this category are heavy metals such as cadmium and lead. It is well understood that these species tend to accumulate in the fly ash due to the volatile nature of their oxide and chloride compounds. Water-soluble salts of these metals are detrimental if they leach from the ash. Hence there is a problem because it is desired to reduce the amounts of pollutants emitted by combustion processes, while there is a trend for pollution to increase due to the nature of the fuel, and the need to dispose wastes.

It is also desirable to reduce the amount of $NO_x$ (including NO and $NO_2$) in flue gas discharges from combustion systems. Commercial technologies which use urea or ammonia are often not suitable in processes combusting waste materials, due to the high chloride content in the waste. The chlorides react with residual $NH_3$ in the exhaust gas, creating a high opacity plume.

Both physical and chemical treatment methods are known to stabilize soluble heavy metal species in ashes, and thereby prevent the pollutants from migrating out of the ash. Examples of these treatments include heating to extremely high temperatures, in the absence or presence of added reactants, to vitrify metal species into a chemically inert glass. Several chemical treatments have also been disclosed. In the Journal of Air Waste Management Association, E. F. Barth in his article "The SITE Demonstration of the CHEMFIX Solidification/Solidification Process at the Portable Equipment Salvage Company Site", describes the a process, in which soluble silicate reagents are added to waste materials for stabilization via several mechanisms. U.S. Pat. No. 4,737,356, assigned to Wheelabrator Environmental Systems, Inc., discloses the addition of water-soluble phosphates to separated combustion ashes to decrease the mobility of lead and cadmium. Behel, et al, in their article "Attenuation of Cd and Pb Solubility in Municipal Waste Incineration Ash", in Soil Sci. Plant Anal., Vol 17, No. 4, pp 385-392 (1986) discuss addition of lime, calcium carbonate, alkali phosphate salts, elemental sulfur, and various wet and dry wastes from coal-fired steam plants for stabilizing ashes from waste-to-energy facilities. Pending U.S. application Ser. No. (811-P-US04267) 07/757,359 also describes a process in which calcium-containing compounds are added to fly ash and the mixture is thereafter subjected to thermal treatment. In each of these cases, the treatment of the subject material, e.g. ash, occurs after generation and separation. Consequently, for these chemical treatments to be effective, the chemical agent must be intimately mixed with the ash. Since the ash is typically a dry powder or granular material, effective contacting is difficult and requires additional equipment, such as ball mills, blenders, or other solid/solid or liquid/solid contacting devices. There is no prior art on the addition of elemental phosphorus for ash stabilization.

Another technique for metals stabilization is described in pending U.S. application Ser. No. (811-P-US04689) 07/757,361 wherein fly ash obtained after lime scrubbing is subjected to thermal treatment.

Addition of red phosphorus to the flue gas of combustion processes for reducing the concentration of $NO_x$ therein has been proposed in Patent Application 32 38 424 of Hoechst AG published by the Federal Republic of Germany. Specifically, this document teaches that the intimate contacting of such flue gas with an oxidizing gas and a suspension of red phosphorus in an inert liquid, such as water, is effective to remove NO. The operability of this suggested technique is, at best, erratic and not adequately effective. Chang and Lee, in their paper entitled "ILBL PhosNOX Process for Combined Removal of $SO_2$ and $NO_x$ from Flue Gas", presented at the 1991 Summer AICHE Summer National Meeting, discuss contacting an aqueous mixture or slurry of yellow phosphorus with a flue gas to remove $NO_x$. The contacting is effected by introducing the yellow phosphorus into either the acid gas scrubber or prescrubber, which is shown to be located downstream of the particulate solids removal, i.e. the bag house or electrostatic precipitator (ESP). Both of these references are directed solely to the reduction or removal of $NO_x$ and do not address to problem of metals stabilization in ash.

SUMMARY OF THE INVENTION

This invention is directed to a process for the stabilization of heavy metals in ash, particularly fly ash, produced in a combustion system having a combustion zone in which a combustible material and an oxygen-containing material are combusted to produce at least a solid particulate containing gaseous combustion product and a downstream particulate separation device for removing at least a portion of such solid particulate material from the gaseous combustion product. The process of this invention comprises introducing into the combustion system a phosphorous oxide specie. The point of introduction can be in the particulate separation device or at a point upstream of the particulate separation device. The flue gas is thereafter subjected to treatment for particulate separation. The phosphorous oxide specie can be introduced per se or it can be formed in situ by introducing elemental yellow phosphorus into the combustion system at a point in the system such that the introduced yellow phosphorus will be subjected to a temperature of at least about 60° F. while in contact with a gaseous mixture having an oxygen concentration of at least the stoichiometric quantity necessary to convert a major quantity of the elemental phosphorus into a phosphorous oxide specie for a period of time of at least about one second.

The phosphorous oxide specie can be introduced at any place in the system upstream of the particulate separation device and the elemental yellow phosphorus can also be introduced at any place in the system upstream of the particulate separation device where it will be subjected to the required conditions for in situ formation of a phosphorous oxide specie. The phosphorous oxide specie and the elemental yellow phosphorus can also be introduced into the system upstream of the combustion zone.

The phosphorous oxide specie utilized in this invention can be any of the phosphorous oxide compounds fanned by the elemental phosphorus under the conditions encountered in the combustion system of this invention. When a phosphorous oxide specie, per se, is employed any of the generally available phosphorous compounds, including, for example, phosphoric acids, such as orthophosphoric acid, hypophosphpric acid, metaphosphoric acid and pyrophosphoric acid can be used. A variety of phosphate salts can also be employed, including, for example, monohydrogen phosphate, dihydrogen phosphate and the alkali and calcium salts of mono- and di-hydrogen phosphate.

The combustion system can also include an acid gas removal step embodied in an acid gas removal device (scrubber) of the types well known in the art. If the combustion system comprises a "dry" acid gas scrubber located downstream of the combustion zone and upstream of the particulate separation device, the elemental phosphorus or phosphorous oxide specie can be introduced into the dry scrubber per se, either as a separate stream or as part of the alkaline or sorbent slurry charged to the dry scrubber. If, on the other hand, the system employs a "wet" acid gas scrubber, such scrubber will be located downstream of the particulate separation device and, therefore, the phosphorous oxide specie or elemental phosphorus will not be added to the scrubber.

The amount of phosphorus added to the system is a function of the composition of the ash and the combustor operating conditions. If an acid gas scrubber, particularly a dry scrubber, is employed in the system, the amount of sorbent added to remove acid gases also has an influence on the amount of phosphorus to be added. Although the chemistry of the imobilized metal species is not fully understood, it is believed that the minimum ratio of phosphorus to heavy metal ions required is about 1/1 on a molar basis. Due to the competing chemical reactions among the ash species for phosphorus, the practical molar ratio range will usually be greater than about 1/1, and can exceed 1000/1 depending on the nature of the ash. Typical operating ranges, however, will generally vary from about 1/1 to about 100/1, and preferably less than about 50/1, with molar ratios of less than about 30/1 being acceptable. Since the concentration of heavy metals in the ash is often not known, a practical estimate of the amount of elemental phosphorus to be employed is from about 0.1% to about 10% by weight of the total amount of fly ash.

As mentioned above, elemental yellow phosphorus can be introduced at any point in the system upstream of, or in, the final particulate collection device. Downstream of or at the point where phosphorus is introduced into the system, the flue gas must contain sufficient $O_2$ to oxidize the elemental phosphorus. Although the stoichiometric ratio for phosphorus oxidation is 20 $O_2/P_4$ on a mole/mole basis, the practical limit is a ratio of about 100 $O_2/P_4$. This condition will generally be met, since $O_2$ concentrations at any point in combustion processes usually exceed 1% by volume. Supplemental air or $O_2$ can be added to the flue gas, if the flue gas is $O_2$ deficient or if a higher concentration of $O_2$ in the flue gas is desired.

The process of this invention is capable of operating over a wide range of temperatures. Typically, elemental yellow phosphorus will oxidize well at temperatures below room temperature (e. g. , about 60° F.) and will oxidize rapidly at temperatures of about 80° F. or greater. Consequently, there must be some point in the process between the point at which elemental phosphorus is introduced and the final particulate removal device where the temperature of the process is greater than about 60° F. and preferably is greater than about 80° F. As a practical matter, the lower operating temperature in the system can be dictated by the need to evaporate water used to slurry the elemental phosphorus so that the water content of the gas is below its saturation point. The upper temperature employed in the system is set by restrictions on materials of construction or by the need to recover thermal energy from the combustion process, and will not be limited by the chemistry of the elemental phosphorus oxidation. Thus, the temperature of the flue gas can be greater than about 150 or 200° F., with temperatures of at least about 250° F. not being unusual. On the other hand, temperatures of the flue gas rarely exceed a few thousand °F., e. g. 2500° F., with temperatures of less than about 550° F. or even less than about 450 or 300° F. being common. Preferably the temperature will be at least about 200° F. and more preferably at least about 250° F.

In a typical system of the type required by this invention the minimum oxygen concentration in the system will be at least about one per cent by volume and usually at least about two per cent by volume. Unless oxygen enrichment is being practiced, the concentration of oxygen in the system of this invention will generally not exceed about 20 or 21 per cent by volume.

Since the reactions required by this invention occur quite rapidly, the residence or contact time between introduction of the yellow elemental phosphorus or phosphorous oxide specie and separation of particulate solids can be quite short. Usually, a residence time of one second is found to be adequate. Typically, residence times of up to one or two minutes are encountered when the elemental yellow phosphorus or phosphorous oxide specie is introduced into the system downstream of the combustion zone, e.g. into the particulate separation device. If, on the other hand, the elemental yellow phosphorous or the phosphorus oxide specie is introduced into the combustion zone or upstream thereof, residence or contact times of one to two hours can be encountered. Oxidation of elemental phosphorus is known to yield various phosphorous oxide species, including $P_2O_5$, $P_2O_3$, and $PO_2$. The predominant species will be $P_2O_5$.

Several methods for introducing elemental yellow phosphorus into the system, particularly into the flue gas, are available. Since the melting point of yellow phosphorus is relatively low (104° F.), it can be heated and injected as a liquid. Alternatively, solid elemental yellow phosphorus can be injected directly. Due to its flammable nature, a safer option is to disperse finely divided particles of the yellow elemental phosphorus into a non-reactive liquid, and inject the dispersion or mixture into the system, e.g. into the flue gas. Conveniently, the elemental yellow phosphorus can be slurried in water and the slurry then injected into the flue gas. Because elemental yellow phosphorus is insoluble in water, it is desirable to disperse the phosphorus as a fine suspension. This can be accomplished by shearing the slurry with a mixer or injecting it through a nozzle.

In accordance with a particular embodiment of this invention, it is also possible to effect a reduction in the $NO_x$ content of the flue gas. If metal stabilization of the ash with concomitant $NO_x$ reduction of the flue gas is desired, elemental yellow phosphorus is injected at a point downstream of the combustion zone and either in or upstream of the acid gas removal device and, of course, upstream of the particulate separation device. Thus, for example, in systems equipped with dry scrubbers (located upstream of the particulate separation device), the preferred injection point for the elemental phosphorus is in the duct leading from the combustion zone to the dry scrubber, or in the dry scrubber itself. If the elemental phosphorus is added directly to the dry scrubber, it is possible to co-feed phosphorus and sorbent in the same slurry. If co-feeding is not used, the sorbent can be fed at the same point or downstream of the elemental phosphorus injection point to maximize the reduction in $NO_x$. In systems of this invention equipped with wet scrubbers (located downstream of the particulate separation device), the injection point for the elemental yellow phosphorus is in the duct leading from the combustion zone to the particulate separation device, or in the particulate separation device itself. The extent of $NO_x$ reduction will vary with the desired level of metal stabilization.

DESCRIPTION OF THE FIGURE

The FIGURE is a schematic process flow diagram of a combustion system in which the process of this invention is practiced.

DETAILED DESCRIPTION OF THE INVENTION

Referring now to the FIGURE, there is shown a schematic process flow diagram of a combustion system embodying the present invention and illustrating various embodiments thereof. Fuel, which can comprise substantially any combustible material containing quantities of heavy metals such as lead and cadmium and which can include trash or municipal solid waste (MSW), is introduced via line 10 into combustion zone 12. An oxygen containing material, such as, for example air or oxygen enriched air, is also introduced into combustion zone 12. In the FIGURE, lines 14 and 16 illustrate the introduction of separate streams of primary and secondary air, respectively. The metals containing fuel material is combusted in the presence of oxygen in the combustion zone to produce solid combustion products in relatively large pieces, generally termed bottom ash, which is removed from combustion zone 12 via line 18. Also produced in combustion zone 12, is a gaseous combustion product containing finely divided solid particulate material (fly ash). This particulate containing flue gas is shown as being removed from combustion zone 12 via line 20 and thence into particulate separation device 22 (particulate removal device) (which can be a baghouse or an electrostatic precipitator).

By means well known in the art, the particulate removal device 22 functions to separate from the flue gas, the finely divided particulate matter generally termed fly ash. This is illustrated as being removed from particulate removal device 22 via line 24. As illustrated in the FIGURE, the bottom ash of line 18 and the fly ash of line 24 can be combined in line 26 to provide a combined ash. Alternatively, the bottom ash can be separately removed from the system via line 28, while the fly ash can be separately removed from the system via line 30. Whether the bottom ash and fly ash are separately removed and separately handled or combined into a combined ash is a matter of choice to the operator.

After fly ash has been removed from the flue gas in particulate removal device 22, the now substantially particulate free flue gas is removed from particulate removal device 22 by line 32 and passed to stack 34, whereby it is exhausted from the system.

Also illustrated in the FIGURE is the optional utilization of acid gas removal techniques such as by scrubbing with an alkaline slurry in manners well known in the industry. Thus, for example, the flue gas of line 20 can be subjected the type of acid gas removal technique sometimes referred to as spray dry absorption or dry scrubbing. This type of operation is illustrated through the presence of optional dry scrubber 36. Essentially, an alkaline slurry (e.g., lime) is introduced into scrubber 36 via line 38 and the slurry is sprayed into intimate compact with the flue gas, whereby the alkaline components in the slurry react with the acid gas components to form acid gas salts and wherein all of the water of the slurry is evaporated. The solid reaction products of the scrubber along with the other solid particulate matter are removed in particulate separation device 22 as fly ash.

Also illustrated in the FIGURE is an alternative, optional acid gas scrubbing technique wherein the flue gas exiting from particulate separation device 22 via line 32 is subjected to scrubbing in wet scrubber 40. In this operation, an alkaline slurry is introduced into wet scrubber 40 by means of line 42. In many wet scrubber operations, the alkaline agent is limestone. The limestone slurry and the flue gas flow through a tower and then the liquid slurry, after having reacted with the acid gas components, is separated from the flue gas and removed from the wet scrubber as illustrated in the FIGURE by line 44.

As mentioned previously, the introduction of the phosphorous oxide specie or the elemental yellow phosphorus (hereinafter referred to as the "phosphorus additive" and intended to encompass either or both elemental yellow phosphorus and a phosphorous oxide specie) can occur at substantially any place in the system including the particulate removal device or any point upstream thereof. Thus, the FIGURE illustrates the introduction of the phosphorus additives at a variety of points in the combustion system. In this connection it will be noted that the phosphorus additive can be introduced into the system by adding it to the fuel component prior to introduction thereof into combustion zone 12. This mode of operation is illustrated by line 46 showing the introduction of the phosphorus additive into the fuel of line 10. Similarly, the phosphorus additive can also be introduced into the system along with the oxygen containing material charged to the combustion zone, such as by introducing the phosphorus additive into the primary or secondary air streams as illustrated by lines 48 and 50, respectively. It is also feasible to introduce the phosphorus additive directly into the combustion zone 12 as a separate stream as illustrated by line 52. It is also acceptable to introduce the phosphorus additive into the flue gas leaving combustion zone 12. This is illustrated by line 54.

If the flue gas of line 20 is subjected to treatment in a spray dry absorber such as dry scrubber 36 for purposes of acid gas removal, the phosphorus additive can be introduced into such scrubber in the form of a separate stream, as illustrated by line 56 or the phosphorus additive can also be incorporated into the sorbent slurry. This is illustrated by means of line 58 which introduces the phosphorus additive into the sorbent slurry of line 38. Further, if the flue gas of line 20 is subjected to acid gas treatment prior to final particulate removal such as in particulate removal device 22, the phosphorus additive can also be injected into the flue gas of line 20 at a point downstream of the acid gas treatment (dry scrubber 36) and upstream of the solid particulate removal device (particulate removal device). This is illustrated by means of line 60.

It is also acceptable to introduce the phosphorus additive into the solid particulate removal device itself. This is illustrated in the FIGURE by means of line 62 showing the introduction directly into the particulate removal device 22.

If one wishes to effect concomitant reduction in the NOx content of the flue gas and heavy metals stabilization of the ash, then elemental yellow phosphorus must be introduced into the combustion system at a point which is no further downstream than both the solid particulate removal device and the acid gas treatment step. Thus, for example, in the FIGURE, if the optional wet scrubbing treatment of the flue gas of line 32 is practiced, then the injection of elemental yellow phosphorus can be practiced in the solid particulate removal device or any point upstream thereof. This is illustrated in the FIGURE by introduction of the elemental yellow phosphorus into the particulate removal device 22 as illustrated by line 62 or by introduction into the flue gas of line 20 as illustrated by either lines 54 or 60 (which become equivalent introduction points in the absence of dry scrubber 36).

If on the other hand, however, the optional use of acid gas scrubbing of the flue gas in line 20 as illustrated by dry scrubber 36 is practiced, then the injection of the elemental yellow phosphorus downstream of dry scrubber 36, such as illustrated by lines 60 and 62, would not be acceptable. The use of the injection points illustrated by lines 60 and 62 would still be effective in the stabilization of the heavy metals, but would not provide the added benefit of simultaneous NOx reduction. Introduction of the elemental yellow phosphorus as illustrated by lines 54, 56 and 58 would still provide the concomitant NOx reduction along with metal stabilization of the ash.

The following Examples 1 through 3 simulate the addition of elemental phosphorus to a combustion system of the type illustrated in the FIGURE wherein the elemental phosphorus is introduced at a point downstream of the combustion zone 12 but upstream from the particulate removal device 22, such as by means of any of the lines 54, 56, 58 or 60. In these examples 2.5 gram samples of a combustion ash residue (fly ash) from a 2200 ton per day municipal solid waste (MSW) incinerator were each mixed with 2.5 grams of a 50/50 wt % mixture of Ca(OH)$_2$ and CaCl$_2$ (simulating scrubber residues). To these 5.0 gram combined samples were added various amounts of elemental phosphorus and the combined sample was oxidized at room temperature with air for periods of time in excess of one hour up to about one and one-half hour (sufficient to insure complete oxidation of all of the phosphorus).

These samples of simulated fly ash were each combined with 45 gram samples of bottom ash from the same MSW facility to yield a combined ash characteristic of the facility (i.e. mixed ash comprised of 10 wt % fly ash and 90 wt % bottom ash). The combined ash was tested following the method of the U.S. EPA Toxicity Characteristic Leaching Procedure (40 CFR Part 261, et al. Federal Register, Mar. 29, 1990), except that smaller quantities of ash were used for the tests. As is typical of these types of wastes, the only heavy metals which leach at significant quantities are lead and cadmium.

EXAMPLE 1

In this example a 5 gram sample of the combined ash described above, but without any elemental phosphorus, was subjected to the TCLP type test in order to establish a baseline level of lead and cadmium in the leachate. The results shown below are the average of triplicate experiments.

TABLE I

| Run | Additive Concentration (g/g Fly ash) | Pb in Leachate Conc. (ppm) | Reduction (%) | Cd in Leachate Conc. (ppm) | Reduction (%) |
| --- | --- | --- | --- | --- | --- |
| Blank | 0.0 | 41 | — | 4.43 | — |

EXAMPLE 2

In the following series of runs, various concentrations of yellow elemental phosphorus were tested following the procedure noted above. The amount of elemental yellow phosphorus added to the fly ash is expressed in a weight ratio of grams of phosphorus additive per gram of fly ash.

TABLE II

| Run | Additive Conc (g/g Fly ash) | Pb in Leachate Conc. (ppm) | Reduction (%) | Cd in Leachate Conc. (ppm) | Reduction (%) |
| --- | --- | --- | --- | --- | --- |
| 1 | 0.0112 | 34 | 17 | 4.35 | 2 |
| 2 | 0.0231 | 31 | 24 | 4.40 | 1 |
| 3 | 0.0277 | 24 | 43 | 4.25 | 4 |
| 4 | 0.0435 | 16 | 62 | 4.35 | 2 |
| 5 | 0.0554 | 12 | 72 | 4.10 | 8 |
| 6 | 0.0679 | 4 | 89 | 3.65 | 18 |
| 7 | 0.0897 | 2 | 95 | 3.20 | 28 |

From the above data, it can be seen that the introduction of elemental yellow phosphorus in quantities greater than 14 by weight of the fly ash and the oxidation thereof is effective to reduce the leachate concentrations of both lead and cadmium. As the amount of elemental phosphorus added to the ash increases, the extent of stabilization of both lead and cadmium increases. It should also be noted that this example is a simulation and that in actual practice a greater degree of mixing of phosphorus and fly ash would be accomplished and a more efficient operation would be obtained.

EXAMPLE 3

In this example a series of samples analogous to those of Example 2 were prepared except that elemental red phosphorus was employed.

TABLE III

| Run | Additive Concentration (g/g Fly ash) | Lead in Leachate Conc. (ppm) | Lead in Leachate Reduction % | Cadmium in Leachate Conc. (ppm) | Cadmium in Leachate Reduction % |
|---|---|---|---|---|---|
| 1 | 0.0099 | 47 | (15) | 4.45 | 0 |
| 2 | 0.0195 | 53 | (29) | 4.40 | 1 |
| 3 | 0.0291 | 29 | 29 | 4.40 | 1 |
| 4 | 0.0383 | 30 | 27 | 4.50 | (2) |
| 5 | 0.0565 | 36 | 13 | 4.40 | 1 |
| 6 | 0.0739 | 26 | 37 | 4.50 | (2) |
| 7 | 0.0907 | 38 | 9 | 4.45 | 0 |

*Quantities in ( ) indicate negative values.

From the data of Table III it can be seen that elemental red phosphorus is substantially less effective than elemental yellow phosphorus for lead stabilization and provides somewhat erratic results. It also appears that red phosphorus has substantially less affect upon cadmium stabilization than yellow phosphorus, to the extent that the data are not conclusive as to its impact at all.

EXAMPLE 4

In this example a system of the type described in connection with the FIGURE and equipped with a spray dry absorber (dry scrubber 36) is employed to illustrate the injection of elemental yellow phosphorus to achieve both ash stabilization and $NO_x$ reduction by the injection of the phosphorus upstream of the dry scrubber 36, for example by means of line 54, or by injection into the acid gas scrubbing device 36, for example by means of lines 56 or 58. In this case, the preferred mode of injection is simply to combine an aqueous slurry of finely divided elemental yellow phosphorus with the aqueous acid gas scrubbing slurry, such as illustrated by means of line 58.

The yellow phosphorus oxidizes in the presence of the flue gas at 450F in less than 1 second. Residence time in the dry scrubber is approximately 6 seconds. The $O_2$ concentration is 8% by volume.

The combustion system of this example is a simulation of an MSW incineration plant having a feed rate of 800 ton/day of MSW and producing 200 ton/day of total ash. The dry scrubber 36 uses hydrated lime as the sorbent material for removing acid gases. The nominal flue gas flow rate is 18,000 lb-mol/hr with a $NO_x$ exit concentration of 250 ppm. Table IV, below, shows the various rates of lime and elemental yellow phosphorus addition, the reduction in leachable lead and cadmium from the ash, and the reduction in NO from the flue gas.

TABLE IV

Basis:
800 TPD Trash; 25 wt % ash
18,000 lb-mol/hr Flue gas; 250 ppm NO; 500 ppm HCl;
150 ppm $SO_2$

| P Rate (lb/hr) | Lime Rate (lb/hr) | P/cmbd ash (g/kg) | P/NO (mol/mol) | % Reduction Lead | % Reduction Cadmium | % Reduction NO |
|---|---|---|---|---|---|---|
| None | 410 | 0.0 | 0.0 | — | — | — |
| 27.9 | 487 | 1.7 | 0.2 | 30 | 2 | 10 |
| 55.8 | 513 | 3.3 | 0.4 | 75 | 8 | 18 |
| 83.7 | 564 | 5.0 | 0.6 | 90 | 12 | 40 |
| 111.6 | 616 | 6.7 | 0.8 | 96 | 25 | 50 |
| 139.5 | 667 | 8.4 | 1.0 | 99 | 40 | 60 |

From the above data it can be seen that both ash stabilization and $NO_x$ reduction can be attained simultaneously in accordance with this invention at phosphorus addition rates equal to or greater than 0.1 wt % of the combined ash. Further it can be seen that such beneficial results are obtained quite efficiently.

Example 5

In this Example a system of the type described in connection with the FIGURE and equipped with a wet scrubber 40 for treatment of flue gas in line 32 downstream of the solid particulate removal device 22, such as an electrostatic precipitator (ESP), is employed. In this Example elemental yellow phosphorus in the amount of 0.4 grams per kilogram of Municipal Solid Waste feed (g/kg MSW) is introduced into the flue gas downstream of combustion zone 12 such as, for example, by means of line 54 or 60 (which are equivalents in the absence of dry scrubber 36) or by means of line 62 where the elemental phosphorus is introduced directly into ESP 22. This addition produces a molar ratio of P to heavy metal Pb of approximately 35:1. In any event the introduction of the elemental yellow phosphorus at any of these points will result in having the phosphorus exposed to a temperature of at least 200° F. and an oxygen concentration of at least one per cent by volume (1% by vol.) for a period of time of at least one second. The operation of this invention in the present mode effects not only stabilization of heavy metals in the fly ash removed from the solid particulate removal device 22 by means of line 24, but also effects conversion of the NO in the flue gas into $NO_2$, which is then removed at the acid gas removal operation as illustrated in wet scrubber 40.

Example 6

In this Example, again using a combustion system as illustrated in the FIGURE, elemental yellow phosphorus is introduced into the system by including it in the mixture of material charged to the combustion zone 12. Thus, an aqueous slurry of elemental yellow phosphorus is sprayed onto the municipal solid waste (MSW) as it is charged to the combustion zone 12 as illustrated by means of line 46. The slurry of elemental yellow phosphorus is added at a rate so as to provide a proportion of phosphorus to MSW material of 5 g/kg MSW feed. This addition rate produces a molar ratio of P to heavy metal Pb of approximately 450:1. Again, the elemental phosphorus is introduced into the system at a point wherein it is subjected to a temperature greater than 2400° F. and an oxygen concentration greater than 20% by vol. for a period of time of at least one hour thereby permitting the stabilization of heavy metals in the ash.

Example 7

In this Example, again using a combustion system as illustrated in the FIGURE, elemental yellow phosphorus is introduced into the system by including it in the mixture of material charged to the combustion zone 12. Thus, an aqueous slurry of elemental yellow phosphorus is injected into the primary air of line 14 as illustrated by means of line 48 as it is charged to the combustion zone 12. The slurry of elemental yellow phosphorus is added at a rate so as to provide a proportion of phosphorus to MSW material of 2.5 g/kg MSW feed. Again, the elemental phosphorus is introduced into the system at a point wherein it is subjected to a temperature greater than 2000° F. and an oxygen concentration of about 2% by vol. for a period of time of at least 20 seconds thereby permitting the stabilization of heavy metals, i.e. lead and cadmium, in the ash.

Example 8

In this Example, again using a combustion system as illustrated in the FIGURE, elemental yellow phosphorus is introduced into the system by including it in the mixture of material charged to the combustion zone 12. Thus, an aqueous slurry of elemental yellow phosphorus is injected into the secondary air of line 16 as illustrated by means of line 50 as it is charged to the combustion zone 12. The slurry of elemental yellow phosphorus is added at a rate so as to provide a proportion of phosphorus to MSW material of 2 g/kg MSW feed. Again, the elemental phosphorus is introduced into the system at a point wherein it is subjected to a temperature greater than 1600° F. and an oxygen concentration of about 2% by vol. for a period of time of at least 15 sec. thereby permitting the stabilization of heavy metals, i.e. lead and cadmium, in the ash.

Example 9

In this Example, again using a combustion system as illustrated in the FIGURE, elemental yellow phosphorus is introduced into the system by including it in the mixture of material burned in the combustion zone 12. Thus, an aqueous slurry of elemental yellow phosphorus is sprayed directly into the mixture of MSW and air (primary and secondary) charged to the combustion zone 12 as illustrated by means of line 52. The slurry of elemental yellow phosphorus is added at a rate so as to provide a proportion of phosphorus to MSW material of 5 g/kg MSW feed. Again, the elemental phosphorus is introduced into the system at a point wherein it is subjected to a temperature greater than 2200° F. and an oxygen concentration greater than 5% by vol. for a period of time of at least 20 seconds thereby permitting the stabilization of heavy metals in the ash.

Example 10

In this Example a combustion system such as that illustrated in the FIGURE is utilized wherein the flue gas exiting from combustion zone 12 via line 20 is subjected to acid gas removal treatment in a spray dry absorber as indicated by dry scrubber 36. Also in this Example 3 g/kg MSW feed of $H_3PO_4$, rather than elemental phosphorus, is introduced into the system by introducing it into the flue gas of line 20 downstream of the combustion zone and upstream of dry scrubber 36 as illustrated by means of line 54. By this means, the flue gas of line 20 is intimately contacted with the dispersed $H_3PO_4$ at a temperature of at least 400° F. and an oxygen concentration of about 6% by vol. for a period of about 8 seconds permitting it to react with the heavy metals in the fly ash, thereby stabilizing them. Enhanced removal of NOx from the flue gas is not achieved by the technique of this example.

Example 11

In this Example a combustion system such as that illustrated in the FIGURE is utilized wherein the flue gas exiting from combustion zone 12 via line 20 is subjected to acid gas removal treatment in a spray dry absorber as indicated by dry scrubber 36. Also in this Example 12 g/kg MSW feed of $CAHPO_4 \cdot 2H_2O$, rather than elemental phosphorus, is introduced into the system by incorporating it into the acid gas scrubbing slurry of line 38 as indicated by line 58. By means the flue gas of line 20 is intimately contacted with the dispersed $CaHPO_4 \cdot 2H_2O$ at a temperature of at least 400° F. and an oxygen concentration of about 8% by vol. for a period of about 11 seconds permitting it to react with the heavy metals in the fly ash, thereby stabilizing them. Enhanced removal of NOx from the flue gas is not achieved by the technique of this example.

Example 12

In this Example a system of the type described in connection with the FIGURE and equipped with a wet scrubber 40 for treatment of flue gas in line 32 downstream of the solid particulate removal device 22, such as a baghouse, is employed. In this Example $Ca(HPO_4)_2$ in the amount of 10 g/kg MSW feed is introduced into the flue gas downstream of combustion zone 12 such as, for example, by means of line 54 or 60 (which are equivalents in the absence of dry-scrubber 36) or by means of line 62 where the $Ca(HPO_4)_2$ is introduced directly into the particulate removal device 22. In this Example the $CA(HPO_4)_2$ is intimately contacted with flue gas at a temperature of at about 100° F. and an oxygen concentration of 4% by vol. for a period of about 5 seconds. The operation of this invention in the present mode effects stabilization of heavy metals in the fly ash removed from particulate removal device by means of line 24, but does not result in the reduction of NOx in the flue gas.

What is claimed is:

1. A process for the stabilization of heavy metals n ash produced in a combustion system having a combustion zone in which a combustible material and an oxygen-containing material are combusted to produce at least a gaseous combustion product containing solid particulate material and a downstream particulate separation zone for removing at least a portion of such solid particulate material from the gaseous combustion product, which process comprises introducing into the system at a point no further downstream than the particulate separation zone a phosphorous oxide specie which is formed in situ by adding elemental yellow phosphorus to a point in the system such that the elemental phosphorus will be subject to a temperature greater than about 60° F. while in the presence of a gaseous mixture having an oxygen concentration of at least about one per cent by volume for a period of time greater than about one second and then subjecting the gaseous combustion product to particulate separation to remove particulate material.

2. The process of claim 1 wherein the elemental phosphorus is added to the system at a point upstream of the combustion zone.

3. The process of claim 1 wherein the elemental phosphorus is added to the system in a proportion to the solid particulate material in the range from about 0.2 to about 1.0 grams per gram.

4. The process of claim 1 wherein the elemental phosphorus is added to the system in a proportion to the combustible material in the range from about 0.2 to about 10 grams per kilogram.

5. The process of claim 1 wherein the temperature is in the range from about 200 to about 2500° F.

6. The process of claim 1 wherein the period of time is in the range from about 1 second to about 2 hours.

7. The process of claim 1 wherein the combustion system also comprises an acid gas removal zone located downstream of the combustion zone, the gaseous combustion product also contains $NO_x$ and it is desired to reduce the $NO_x$ content thereof and wherein the elemental phosphorous is added to the system downstream of the combustion zone but no further downstream than the acid gas removal zone.

8. A process for the stabilization of heavy metals in ash produced in a combustion system having a combustion zone in which a combustible material and an oxygen-containing material are combusted to produce at least a gaseous combustion product containing solid particulate material and a downstream particulate separation zone for removing at least a portion of such solid particulate material from the gaseous combustion product, which process comprises introducing into the system at a point no further downstream than the particulate separation zone a phosphorous oxide specie in an amount sufficient to provide a molar ratio of elemental phosphorous to heavy metal ions from about 1/1 to about 1000/1 and then subjecting the gaseous combustion product to particulate separation to remove particulate material.

9. The process of claim 8 wherein the combustion system also comprises an acid gas removal zone located downstream of the combustion zone and upstream of the particulate separation zone and wherein the phosphorous oxide specie is introduced into the system no further upstream than the acid gas removal zone.

10. The process of claim 8 wherein the combustion system also comprises an acid gas removal zone located downstream of the combustion zone and upstream of the particulate separation device and wherein the phosphorous oxide specie is introduced upstream of the acid gas removal zone.

11. The process of claim 8 wherein the phosphorous oxide specie is added to the system at a point upstream of the combustion zone.

12. The process of claim 8 wherein the phosphorous oxide specie is present in an amount sufficient to provide a molar ratio of elemental phosphorous to heavy metal ions from about 1/1 to about 100/1.

13. The process of claim 8 wherein the phosphorous oxide specie is present in an amount sufficient to provide elemental phosphorus in an amount from about 0.1% to about 10% by weight of the total amount of solid particulate material.

14. The process of claim 8 wherein the phosphorous oxide specie is added to the system in a proportion to the combustible material in the range from about 2 to about 15 grams per kilogram.

15. The process of claim 8 wherein the phosphorous oxide specie added to the system is selected from the group consisting of $H_3PO_4$, $CaHPO_4.2H_2O$ and $Ca(H-PO_4)_2$.

16. The process of claim 15 wherein the phosphorus oxide specie is $H_3PO_4$.

* * * * *